United States Patent
Li et al.

(10) Patent No.: US 9,059,611 B2
(45) Date of Patent: Jun. 16, 2015

(54) STATOR CORE

(71) Applicant: JOHNSON ELECTRIC S.A., Murten (CH)

(72) Inventors: Yue Li, Hong Kong (CN); Bao Ting Liu, Shenzhen (CN); Kui Man Lai, Hong Kong (CN); Yong Wang, Shenzhen (CN); Xiao Ning Zhu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 280 days.

(21) Appl. No.: 13/624,730

(22) Filed: Sep. 21, 2012

(65) Prior Publication Data

US 2013/0069479 A1 Mar. 21, 2013

(30) Foreign Application Priority Data

Sep. 21, 2011 (CN) .......................... 2011 1 0283293

(51) Int. Cl.
*H02K 1/12* (2006.01)
*H02K 1/14* (2006.01)

(52) U.S. Cl.
CPC ............ *H02K 1/148* (2013.01); *H02K 2213/03* (2013.01)

(58) Field of Classification Search
CPC ....................................... H02K 1/148
USPC ..................... 310/216.001, 216.009, 216.008
See application file for complete search history.

(56) References Cited

U.S. PATENT DOCUMENTS

| 6,856,064 | B2* | 2/2005 | Masumoto et al. ..... 310/216.008 |
| 6,919,665 | B2 | 7/2005 | Murakami et al. |
| 7,064,469 | B2* | 6/2006 | Jack et al. .............. 310/216.113 |
| 7,777,387 | B2* | 8/2010 | Nagai et al. ............ 310/216.043 |
| 7,814,642 | B1* | 10/2010 | Onimaru et al. ................. 29/596 |
| 2012/0086300 | A1* | 4/2012 | Kim .............................. 310/215 |

FOREIGN PATENT DOCUMENTS

| JP | 10322943 | 12/1998 |
| JP | 11262203 | 9/1999 |

* cited by examiner

*Primary Examiner* — Hanh Nguyen
(74) *Attorney, Agent, or Firm* — Muncy, Geissler, Olds & Lowe, P.C.

(57) ABSTRACT

A stator core includes at least one bendable strip-shaped core. Each strip-shaped core is formed by stacking a plurality of laminations. Each lamination includes at least two yoke portions and at least two tooth portions. Every two adjacent yoke portions are connected to each other via a bendable portion and have two opposite end surfaces, one of the end surfaces having a groove and the other having a projecting rib. After the bendable portion is bent the projecting rib is engaged in the groove to form an interlock structure such that relative circumferential movement between the adjacent yoke portions is limited.

9 Claims, 3 Drawing Sheets ial end of a corresponding yoke portion.
STATOR CORE

CROSS REFERENCE TO RELATED APPLICATIONS

This non-provisional patent application claims priority under 35 U.S.C. §119(a) from Patent Application No. 201110283293.5 filed in The People's Republic of China on Sep. 21, 2011.

FIELD OF THE INVENTION

This invention relates to a stator core and in particular, to a stator core having a number of strip-shaped cores.

BACKGROUND OF THE INVENTION

A typical known stator for a brushless motor comprises a stator core which comprises an annular yoke and a plurality of teeth radially extending from the yoke. Traditionally the stator core is formed by stacking a plurality of stator laminations together and each lamination is a monolithic piece with a closing structure. During production, the stator laminations are stacked together to form the stator core firstly, and then stator windings are wound on the teeth of the stator core. It is not convenient to wind windings on a closing structure, so the winding efficiency is low and sometimes the number of turns of the winding is limited.

U.S. Pat. No. 6,919,665 discloses a stator core which is formed by laminated strip-shaped straight cores. The straight core includes a plurality of yokes, a plurality of teeth extending from the yokes, and bent portions between adjacent yokes. The bent portions are provided with V-shaped notches. A pair of arc shaped fitting portions are formed on a pair of surfaces defining the V-shaped notches so as to prevent relative movement between adjacent yokes. The straight cores are formed into an annular configuration by bending the bent portions in a direction so as to close the V-shaped notches. In this patent the above mentioned problem is able to be solved. However, as the arc shaped fitting portions can only prevent relative axial movement between the adjacent yokes, after the external force for bending a bent portion is withdrawn a rebound between the adjacent yokes may occur, which will result in undesired relative circumferential movement between the adjacent yokes.

Hence, there is a desire to provide a new stator core which addresses this problem.

SUMMARY OF THE INVENTION

Accordingly, in one aspect thereof, the present invention provides a stator core of an electric motor, comprising at least one bendable strip-shaped core, the at least one bendable strip-shaped core forming a circumferential configuration after being bent, each strip-shaped core being formed by stacking a plurality of bendable strip-shaped laminations, each lamination comprising at least two yoke portions and at least two tooth portions extending from the yoke portions, every two adjacent yoke portions being connected to each other by a bendable portion and having two opposite end surfaces, one of the end surfaces having a groove and the other having a projecting rib, wherein before the bendable portion is bent the two end surfaces are spaced from each other, and after the bendable portion is bent the two end surfaces are joined together by the projecting rib being engaged in the groove to form an interlock structure such that the relative circumferential movement between the adjacent yoke portions is limited.

Preferably, each tooth portion extends from one circumferential end of a corresponding yoke portion.

Preferably, each tooth portion is inclined relative to a longitudinal direction of a corresponding yoke portion before the strip-shaped core is bent.

Preferably, the interlock structure extends inwardly and partly beyond a straight line connecting two points of intersection between the tooth portion adjacent the interlock structure and the two adjacent yoke portions joined by the interlock structure.

Preferably, the groove is arranged at the end surface of said one circumferential end.

Preferably, the joined end surfaces are inclined relative to a radial plane passing through the center of the tooth portion adjacent the joined end surfaces.

Preferably, the interlock structure is inwardly inclined relative to a radial plane passing through the center of the tooth portion adjacent the joined end surfaces.

Preferably, the projecting rib and the groove are arranged at inner ends of the two opposite end surfaces.

Preferably, the projecting rib has an elongated configuration with relatively longer outer and inner side edges and a relative shorter end edge.

Preferably, the plurality of strip-shaped laminations are overlapped in the radial direction such that the stacked projecting ribs and the stacked grooves form an interference fit.

In the embodiments of the present invention, the relative circumferential movement between adjacent yoke portions can be avoided after the external force for bending the bent portions is withdrawn.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
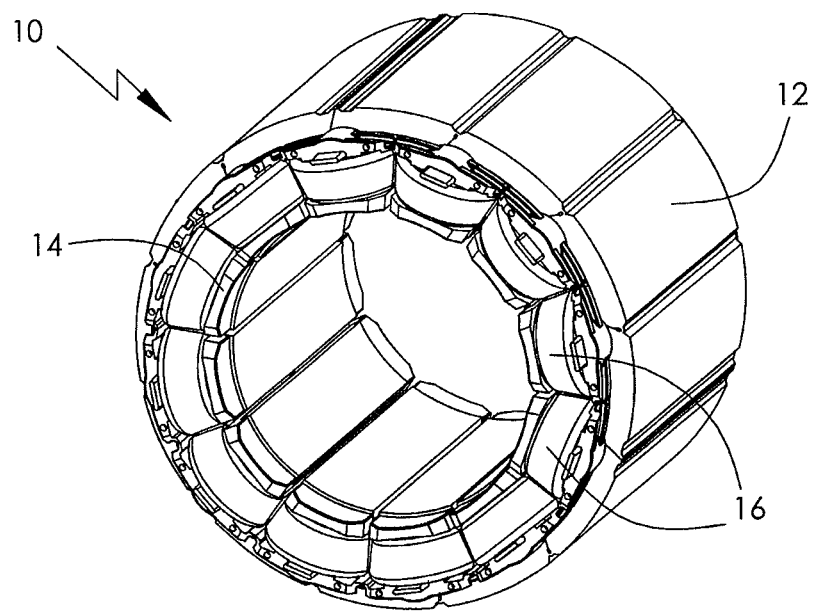
FIG. 1 is a view of a wound stator of an electric motor, having a stator core in accordance with a preferred embodiment of the present invention.

FIG. 1 illustrates a wound stator 10 of an electric motor, having a stator core 12 in accordance with a preferred embodiment of the present invention. A plurality of insulating bobbins 14 with stator windings 16 wound thereon are sleeved on the stator core 12.

Figure 2:
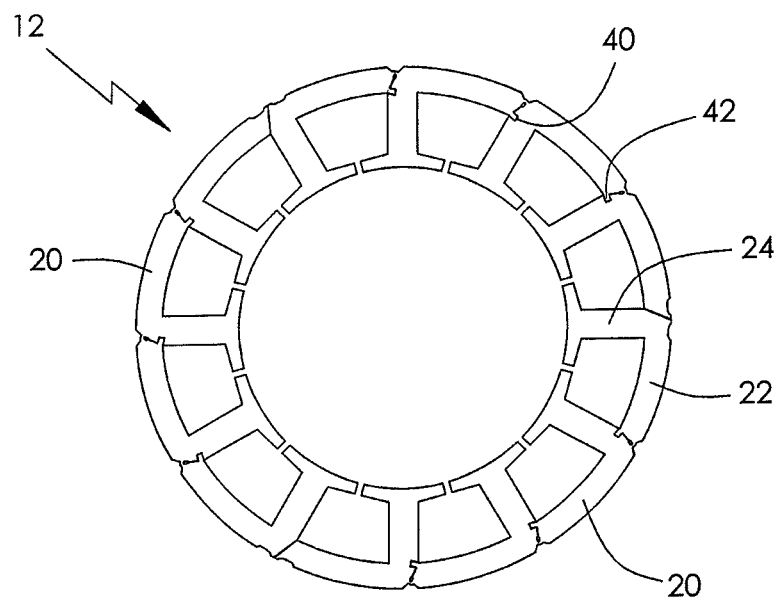
FIG. 2 is a planar view of the stator core.
Figure 3:
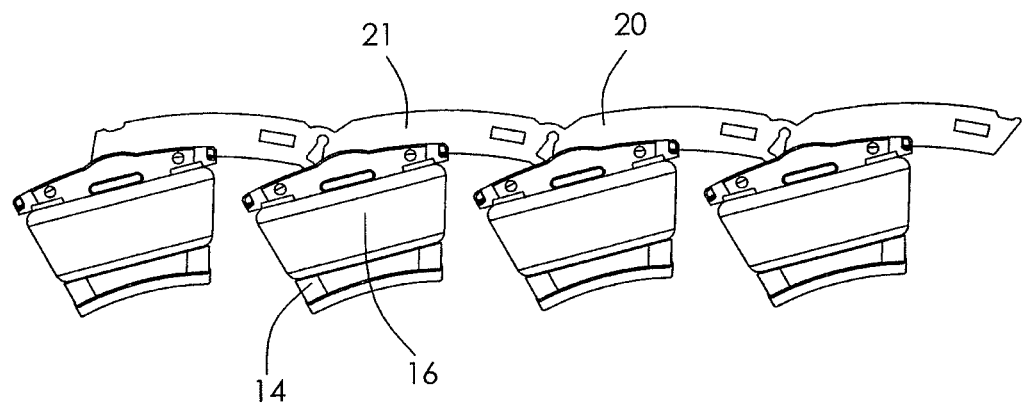
FIG. 3 is view of a strip-shaped core being a part of the stator core of FIG. 2, with stator windings formed thereon.

Referring to FIGS. 2 and 3, the stator core 12 is formed by a plurality of separate bendable strip-shaped cores 20 which are connected end to end in sequence so as to form a circumferential configuration or circle after being bent. The strip-shaped core 20 is formed by stacking a plurality of bendable strip-shaped laminations 21. The stator windings 16 can be formed on the teeth of a strip-shaped core 20 before the strip-core 20 is bent.

Figure 4:
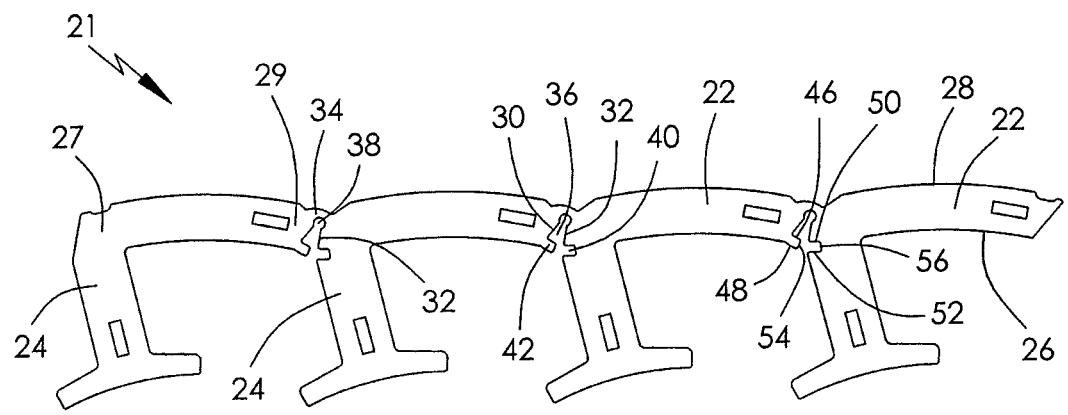
FIG. 4 is a planar view of a strip-shaped lamination being a part of the strip-shaped core of FIG. 3.

FIG. 4 illustrates a bendable strip-shaped lamination 21 before being bent. The strip-shaped lamination 21 comprises a plurality of yoke portions 22 and a plurality of tooth portions 24. Each yoke portion 22 has an inner surface 26, an outer surface 28, and first and second ends 27, 29 in the longitudinal direction thereof. Each tooth portion 24 extends inwardly from the first end 27 of a corresponding yoke portion 22 and is inclined relative to the longitudinal direction of the yoke portion 22. Two opposite end surfaces 30, 32 of every two adjacent yoke portions 22 are connected together by a bendable portion 34 at the outer ends thereof. A gap 36 which is gradually narrower in the direction from the inner surface 26 towards the outer surface 28, is formed between the two opposite end surfaces 30, 32. Between the two opposite end surfaces 30, 32 and the bendable portion 34 an arcuate slot 38 is defined. A groove 40 and a matching projecting rib 42 are formed at the inner ends of the two opposite end surfaces 30, 32.

Figure 5:
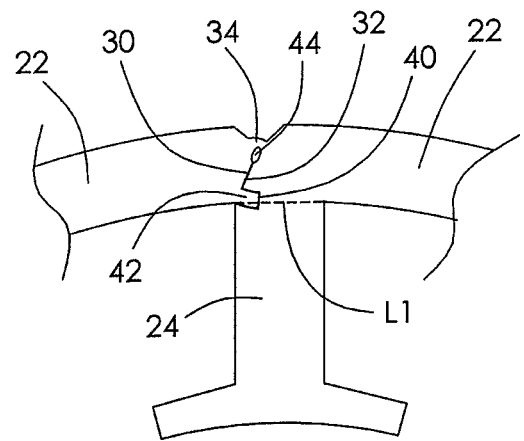
FIG. 5 is a partial view of the strip-shaped lamination after being bent.

As shown in FIG. 5, after the bendable portion 34 between two adjacent yoke portions 22 is bent, the two opposite end surfaces 30, 32 of the two adjacent yoke portions 22 are joined to each other and the arcuate slot 38 forms a hole 44. The two adjacent yoke portions 22 form a part of the circumferential configuration, with the tooth portion 24 extending in the radial direction. The joined end surfaces 30, 32 are inclined relative to the radial direction. The projecting rib 42 is engaged in the groove 40 to form an interlock structure. Both the groove 40 and the projecting rib 42 are inwardly inclined relative to the circumferential direction and partly extend beyond the straight line L1 connecting the points of intersection between the tooth portion 24 and the yoke portions 22. Preferably, the projecting rib 42 has an elongated configuration with relatively longer outer and inner side edges 46, 48 joined with two side surfaces 50, 52 of the groove 40 and a relative shorter end edge 54 joined with a bottom surface 56 of the groove 40.

Figure 6:
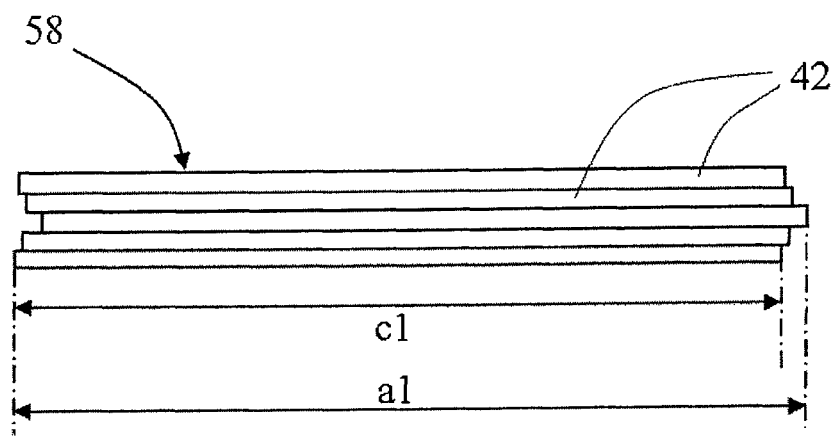
FIG. 6 shows stacked projecting ribs of the stator core of FIG. 2.
Figure 7:
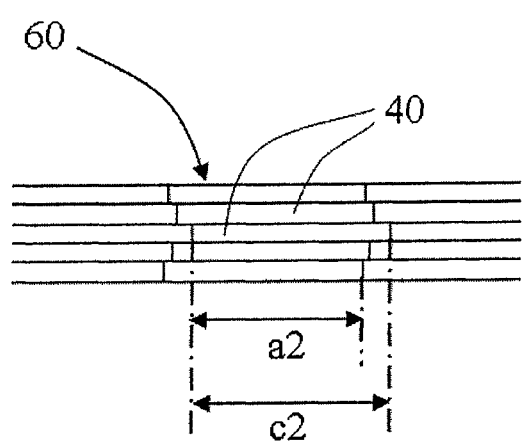
FIG. 7 shows stacked grooves of the stator core of FIG. 2.

Preferably, the stacked laminations 21 of the strip-shaped core 20 are overlapped in the radial direction such that the stacked projecting ribs 58 and the stacked grooves 60 of the laminations are also overlapped in the radial direction. Thus, as shown in the FIGS. 6 and 7, the radial dimension a1 of the stacked projecting ribs 58 is greater than the radial dimension c1 of the projecting rib 42 of a single lamination 21 and the radial dimension a2 of the stacked grooves 60 as a whole is smaller than the radial dimension c2 of the groove 40 of a single lamination 21. By this configuration, the stacked projecting ribs 58 and the stacked grooves 60 form an interference fit.

In the embodiments of the present invention, the relative circumferential movement between adjacent yoke portions 22 can be avoided after the external force for bending the bent portions 34 is withdrawn.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the stator core 12 may alternatively be formed by a single bendable strip-shaped core 20. The tooth portion 24 may extend from positions of the yoke portion 22 other than from one circumferential end.

The invention claimed is:

1. A stator core of an electric motor, comprising at least one bendable strip-shaped core, the at least one bendable strip-shaped core forming a circumferential configuration after being bent, each strip-shaped core being formed by stacking a plurality of bendable strip-shaped laminations, each lamination comprising at least two yoke portions and at least two tooth portions extending from the yoke portions, every two adjacent yoke portions being connected to each other by a bendable portion and having two opposite end surfaces, one of the end surfaces having a groove and the other having a projecting rib, wherein before the bendable portion is bent the two end surfaces are spaced from each other, and after the bendable portion is bent the two end surfaces are joined together by the projecting rib being engaged in the groove to form an interlock structure such that the relative circumferential movement between the adjacent yoke portions is limited, wherein the interlock structure is inwardly inclined relative to a radial plane passing through the center of the tooth portion adjacent the joined end surfaces.

2. The stator core of claim 1, wherein each tooth portion extends from one circumferential end of a corresponding yoke portion.

3. The stator core of claim 2, wherein the groove is arranged at the end surface of said one circumferential end.

4. The stator core of claim 1, wherein each tooth portion is inclined relative to a longitudinal direction of a corresponding yoke portion before the strip-shaped core is bent.

5. The stator core of claim 1, wherein the joined end surfaces are inclined relative to a radial plane passing through the center of the tooth portion adjacent the joined end surfaces.

6. The stator core of claim 1, wherein the projecting rib and the groove are arranged at inner ends of the two opposite end surfaces.

7. The stator core of claim 1, wherein the projecting rib has an elongated configuration with relatively longer outer and inner side edges and a relative shorter end edge.

8. The stator core of claim 1, wherein the plurality of strip-shaped laminations are overlapped in the radial direction such that the stacked projecting ribs and the stacked grooves form an interference fit.

9. A stator core of an electric motor, comprising at least one bendable strip-shaped core, the at least one bendable strip-shaped core forming a circumferential configuration after being bent, each strip-shaped core being formed by stacking a plurality of bendable strip-shaped laminations, each lamination comprising at least two yoke portions and at least two tooth portions extending from the yoke portions, every two adjacent yoke portions being connected to each other by a bendable portion and having two opposite end surfaces, one of the end surfaces having a groove and the other having a projecting rib, wherein before the bendable portion is bent the two end surfaces are spaced from each other, and after the bendable portion is bent the two end surfaces are joined together by the projecting rib being engaged in the groove to form an interlock structure such that the relative circumferential movement between the adjacent yoke portions is limited, wherein the interlock structure extends inwardly and partly beyond a straight line connecting two points of intersection between the tooth portion adjacent the interlock structure and the two adjacent yoke portions joined by the interlock structure.

\* \* \* \* \*